May 16, 1950  E. R. FISH  2,508,061
OVERLOAD RELEASE CLUTCH
Filed Aug. 27, 1946  3 Sheets-Sheet 1
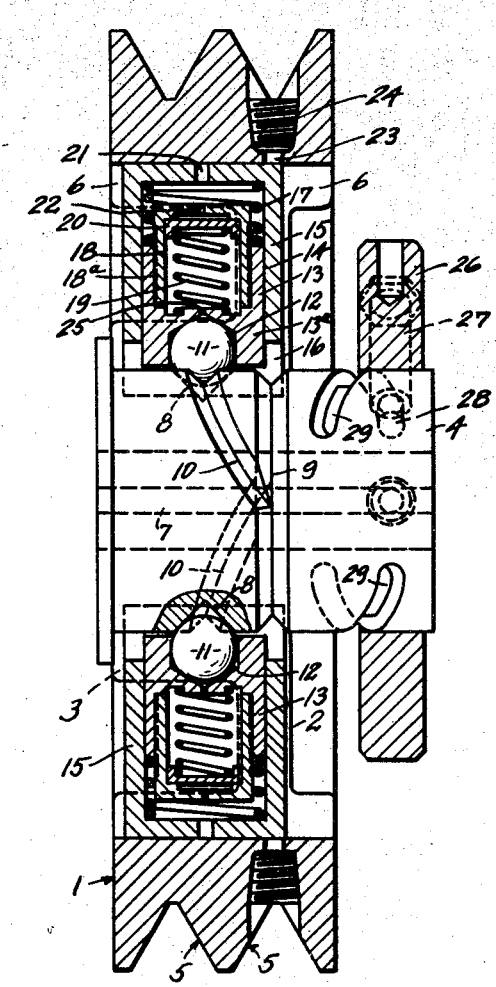
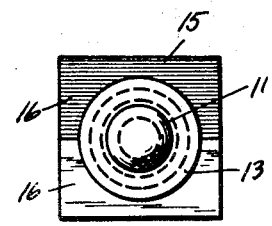
INVENTOR:
EARL R. FISH,
BY
*Bodell & Thompson*
ATTORNEYS.

May 16, 1950 E. R. FISH 2,508,061
OVERLOAD RELEASE CLUTCH
Filed Aug. 27, 1946 3 Sheets-Sheet 2
_Fig-3_
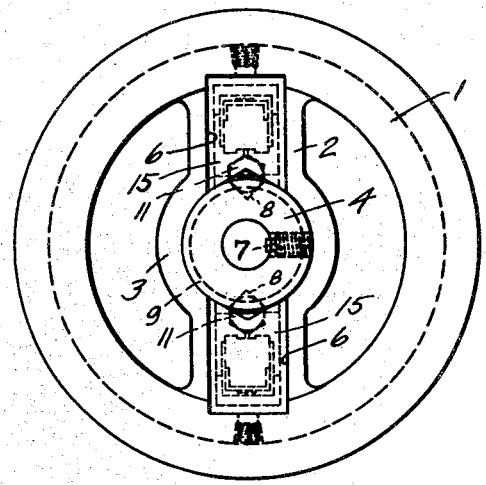
_Fig-4_
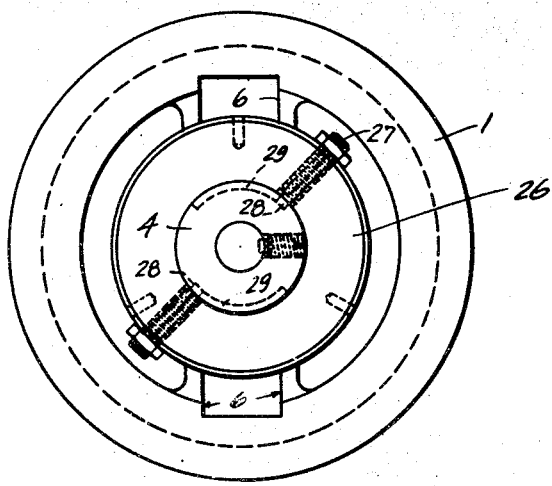
INVENTOR:
EARL R. FISH,
BY
ATTORNEYS.

May 16, 1950 E. R. FISH 2,508,061
OVERLOAD RELEASE CLUTCH
Filed Aug. 27, 1946 3 Sheets-Sheet 3
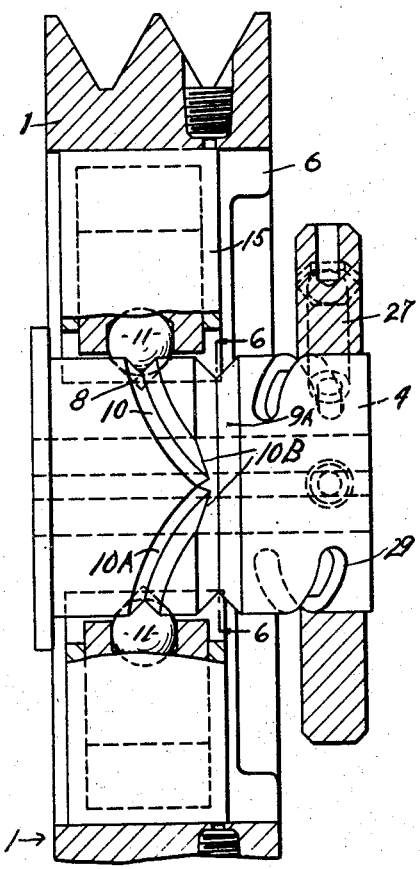
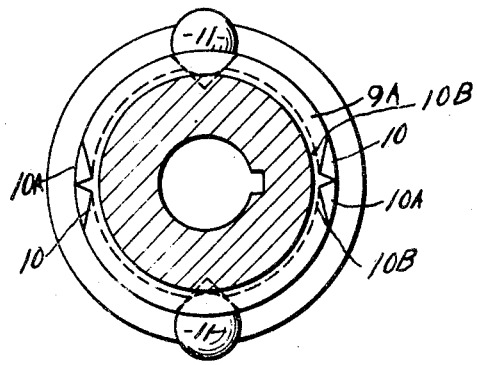
INVENTOR:
EARL R. FISH,
BY
Bodell & Thompson
ATTORNEYS.

Patented May 16, 1950

2,508,061

UNITED STATES PATENT OFFICE 2,508,061

OVERLOAD RELEASE CLUTCH

Earl R. Fish, Syracuse, N. Y., assignor to Lipe-Rollway Corporation, Syracuse, N. Y., a corporation of New York Application August 27, 1946, Serial No. 693,195

4 Claims. (Cl. 192—56)

This invention relates to overload release clutches and has for its object a release clutch in which a poppet normally seated in a socket having cam-shaped bottom, clutches driving and driven elements, together, the poppet being displaced under an overload out of the socket, and also shifted into position where it is out of line with the socket and must be reset in the socket.

The invention further has for its object an overload release or safety clutch, embodied in a pulley to normally clutch the pulley to a shaft, either driving or driven, usually driven, and embodies a spring-pressed poppet normally clutching with a predetermined resistance or stricture, the driving and driven elements together, and displaceable out of its socket and shiftable axially out of line with its sockets under the influence of the overload.

Other objects appear throughout the specification.

The invention consists in the novel features and in the combinations and constructions hereinafter set forth and claimed.

In describing this invention, reference is had to the accompanying drawings, in which like characters designate corresponding parts in all the views.

Figure 1 is a diametrical sectional view of this clutch.

Figure 2 is a detail view of one of the members of the coupling of the clutch.

Figure 3 is an end view of the clutch looking to the right in Figure 1, the reset collar having been removed.

Figure 4 is an elevation or end view looking to the left in Figure 1.

Figure 5 is a view similar to Figure 1 of an overload release clutch operating to release when rotating in either direction in contradistinction to one direction.

Figure 6 is a sectional view taken on the plane of line 6—6, Figure 5.

The clutch is here shown as embodied in a pulley to clutch the pulley to a shaft and operable to release the same from the shaft under increase in torque or overload. This clutch includes driving and driven, concentrically arranged, elements, one located within the other, and a releasable coupling between the elements and extending radially relatively to the same, and including a spring-pressed poppet normally locking or clutching the elements together until a torsional strain or resistance above a predetermined amount is applied to one of them, and displaceable from a socket in the other element in which it is normally seated, the socket having cam-shaped walls, and the element formed with the socket being also formed with an annular groove axially displaced relatively to the socket, and also a groove connecting the socket and the annular groove and being of less depth than the socket, this connecting or transfer groove extending in a general spiral direction and also opening into the annular groove, so that when the poppet is displaced under excessive torsional strain, it moves into the connecting or transfer groove and is guided thereby into the annular groove. When the poppet is displaced out of the socket, no rotary motion is transferred, after the poppet is in the annular groove. Means is provided for resetting the poppet from the annular groove back into the socket. Means is also provided for preventing jumping of the poppet out of the socket under a sudden increase in torque or resistance.

The invention is here shown as embodied in a pulley. The pulley is considered as the driving element, and a sleeve rotatably mounted in the hub of the pulley and mountable upon a shaft to receive motion from the pulley is the driven element. The clutch connects these two elements. However, in so far as this invention is concerned, either pulley or the sleeve may be the driving element, and the other the driven element.

1 designates the driving element including an annular rim and radially-extending spokes 2 which support a hub 3. 4 is the driven element, as a sleeve, rotatably mounted in the hub 3. The rim of the driving element is shown as formed with peripheral grooves 5 for receiving belts. The spokes 2 are formed with passages 6 opening through the inner surface of the hub. These passages 6 also open through both lateral sides of the spokes and also extend partly into the rim. They provide guide passages for the coupling member to be presently described, permitting the coupling member to shift in a direction parallel to the axis of the driving and driven elements. The driven element 4 is here shown as a collar or sleeve secured as by a key 7 on the driven shaft, not shown. The sleeve or collar 4 is cylindrical in general form and is formed with a peripheral socket 8 for receiving a poppet to be described, a peripheral circumferential groove 9 spaced axially from the socket, and a connecting or transfer groove 10 extending in a general spiral direction from the socket 8 to the groove 9 and being of less depth than the socket 8. As here shown, there are two sockets 8 for receiving poppets of couplings located in diametrically opposite spokes. 11 designates the poppets or balls normally seated and impositively interlocking in the sockets 8, the sockets being formed with cam walls, which cam the balls out of the sockets, and hence unclutch the driving and driven elements, when a predetermined force or resistance is applied. As here shown, the balls are arranged in recesses 12 in the inner ends of radially extending plungers 13 slidably mounted in bores 14 formed in carrier blocks 15 slidable in the passages 6 of the spokes 2. The bores 14 open through the inner ends of the blocks toward the periphery of the driven element or sleeve 4. The blocks are provided with V-shaped notches 16 at their inner ends (Figure 2) arranged astride the periphery of the sleeve 4. The plungers 13, and hence the balls 11, are spring-pressed, as by springs 17, interposed between the outer ends in a radial direction of the bores 14 and the ends of the plungers 13.

Each of the couplings is provided with oil dash-pot means for dampening and delaying the action of the plungers 13 during the camming action of the balls 11 out of the sockets 8, when a sudden shock is encountered. This dash-pot means is here shown as provided by forming each plunger 13 hollow, back of its head 13ª, in which the recess 12 for the ball 11 is formed, and locating therein a thimble-like member 18 fixed therein, as by threading at 18ª into the walls of the plunger, providing a compression spring 19 between the head 13ª of the plunger and a sliding head or abutment 20 within the thimble-like member 18 and providing for the restricted flow of hydraulic fluid, as oil, during the displacement of the balls out of the socket. The member 18 is a closure for the interior of the hollow plunger.

As here shown, the blocks 15 are provided with inlet passages 21 into the chamber or bore thereof, in which the plunger is located, and the upper end wall of the thimble-like member 18 is provided with a smaller oil passage 22 into the space above the sliding head 20. The pulley is formed with an oil passage 23 leading from the bottom of one of the belt grooves 5 into the outer wall of the passage 6. When the block 15 is shifted, as will be described, so that its passage 21 alines with the passage 23, oil may then be poured or injected into the block 15 and also into the thimble 18 above the sliding head 20. The inlet passage 23 is closed by a plug 24 and hence the oil is trapped in the block 15 and plunger 13. Also, a duct 25 leads into the socket in which the ball 11 is located from the interior of the plunger. This dash-pot is for the purpose of delaying the unseating of the ball under a sudden jar or increase in torque, and hence permitting uncoupling only under a torque above a progressive increase in load or torque above a predetermined amount or safety point.

In Figure 1, the clutch shown is intended to be used when the rotation or drive is in one direction only. In Figure 5, a clutch is shown capable of releasing when the driving force is applied or the rotation is in either direction. In the construction shown in Figure 5, in addition to the transfer grooves 10, additional spiral grooves 10A leading from the like sides of the sockets 8 as to the right and extending in the opposite directions, as clockwise and counterclockwise, are provided, the grooves 10, 10A opening into the peripheral groove 9A corresponding to the peripheral groove 9. However, the groove 9A is of greater depth than the transfer grooves 10, 10A in order that the balls, when shifted by an overload from the sockets 8 into the groove 9A will not pass during continued rotation from the groove 9A back into the sockets. For example, if the rotation is in such direction that when the overload is applied, the balls 11 pass through the transfer groove 10 into the groove 9A, then the balls will not pass during continued rotation in the same direction back into the sockets through the grooves 10A, or if the rotation is such that the balls are displaced under the overload through the transfer groove 10A, they will not pass through the transfer groove 10 back into sockets. This is due to the fact that where the transfer grooves 10, 10A open into the deeper annular groove 9A, barriers 10B are provided where the shallower transfer grooves 10, 10A open through the V-shaped side of the annular groove 9A. The balls are reset by the collar 27 the same as in the construction shown in Figure 1.

In operation, with the balls 11 normally seated in the sockets, the motion is transferred from the rim of the pulley through the spokes and the coupling including the balls 11 to the sleeve 4, and hence the shaft on which the sleeve is mounted. When the shaft encounters undue resistance or too much torque is applied to the rim of the driving element 1, the balls or poppets 11 are carried out of their sockets into the transfer grooves, so that during continued rotation of the driving element 1, they move along the transfer grooves 10 into the annular groove 9, where they remain and the driving element rotates idly about the driven element or sleeve 4, until the coupling is reset in its normal position. The forcing of the balls radially out of their sockets 8 moves the plungers 13 outwardly against their springs 17, displacing oil in the bores 14 of the blocks 15, and causing the pressure therein to be transferred to the inlet passage 22 into the thimble-like member 18 to the interior of the plunger against the sliding head 20, which reacts on the spring 19. This operation of the oil overcomes any great sudden increase in torque and hence avoids displacement of the balls or uncoupling, except under a steady increase in torque.

When the blocks 15 are displaced axially out of their normal position, they are shifted into position adjacent the reset collar 26 mounted on the sleeve 4. The sleeve is provided with radial screws 27 having followers 28 working in spiral grooves 29 in the sleeve, of a pitch opposite to that of the transfer grooves 10, so that upon turning of the collar, it will, by reason of the followers 28, be shifted to the left and push or reset the blocks 15 back in their normal position in which the poppets or balls 11 will be seated in their sockets 8.

What I claim is:

1. In an overload release clutch, driving and driven concentrically arranged elements, and a releasable coupling between them including a spring-pressed radially shiftable member having a poppet rotatable with one element, and the other element being formed with a socket having cam-shaped walls for receiving the poppet, with an annular groove axially displaced from the socket, and with a connecting groove extending in a generally spiral direction opening into the socket and of less depth than the same, the coupling being shiftable in an axial direction relative to the axis of the driving and driven elements and initially held from shifting by the poppet when the poppet is seated in the socket.

2. In an overload release clutch, driving and driven concentrically arranged elements, one having an annular portion radially spaced outward from the other element, and a spoke portion carrying a hub in which the other element is rotatably mounted, at least one of the spokes being formed with a guide passage extending parallel to the axis of the clutch, and opening through its outer end opposed to the periphery of said other element, and a coupling member slidable in the guide passage including a poppet thrusting radially against the periphery of said other element, the other element being formed with a socket having cam-shaped walls for receiving the poppet, with a groove extending in a generally spiral direction from the socket and being of less depth than the same, and with a circumferentially extending peripheral groove axially spaced from the socket into which the spiral groove opens.

3. In an overload release clutch, driving and driven concentrically arranged elements, one having an annular portion spaced from the other, and spokes and a hub, the other element being mounted to rotate in the hub, one spoke being formed with a guide passage extending in a direction parallel to the axis of the coupling, a carrier block slidably mounted in said guide passage, a spring-pressed plunger movable radially in the carrier and a poppet at the inner end of the plunger, the other element being provided with a socket formed with cam-shaped walls to receive the poppet, with a circumferential groove axially displaced from the socket and with a spiral transfer groove between the socket and the circumferential groove and being of less depth than the socket.

4. In an overload release clutch, driving and driven concentrically arranged elements, one having an annular portion spaced from the other, and spokes and a hub, the other element being mounted to rotate in the hub, one of the spokes being formed with a guide passage extending in a direction parallel to the axis of the driving and driven elements, a carrier block slidably mounted in said guide passage, a spring-pressed plunger movable radially in the carrier block and a poppet at the inner end of the plunger, the other element being provided with a socket having cam-shaped walls to receive the poppet, the plunger having a head in which the poppet is seated and having a hollow radial stem, an abutment slidably mounted in the hollow plunger, a spring interposed between the abutment and the head of the plunger, a closure for the hollow stem of the plunger formed with an oil passage, the bore in which the plunger slides, and the interior of the hollow stem providing an oil dashpot for dampening and retarding the displacement of the poppet out of the socket, the other element being formed with a circumferential groove axially displaced from the socket and with a spiral transfer groove between the socket and the circumferential groove and being of less depth than the socket.

EARL R. FISH.

REFERENCES CITED

The following references are of record in the file of this patent:

UNITED STATES PATENTS

| Number | Name | Date |
|---|---|---|
| 1,883,164 | Vassakas | Oct. 18, 1932 |
| 2,091,269 | Colman | Aug. 31, 1937 |
| 2,225,069 | Marsh | Dec. 17, 1940 |
| 2,401,992 | Waller | June 11, 1946 |
| 2,408,501 | Wright | Oct. 1, 1946 |